（12）United States Patent
Benouali et al.

(10) Patent No.: US 11,933,529 B2
(45) Date of Patent: Mar. 19, 2024

(54) METHOD FOR CONTROLLING A THERMAL MANAGEMENT DEVICE OF A MOTOR VEHICLE

(71) Applicant: Valeo Systemes Thermiques, Le Mesnil Saint-Denis (FR)

(72) Inventors: Jugurtha Benouali, Le Mesnil Saint-Denis (FR); Régis Beauvis, Le Mesnil Saint-Denis (FR); Jin-Ming Liu, Le Mesnil Saint-Denis (FR)

(73) Assignee: Valeo Systemes Thermiques, Le Mesnil Saint-Denis (FR)

( * ) Notice: Subject to any disclaimer, the term of this patent is extended or adjusted under 35 U.S.C. 154(b) by 128 days.

(21) Appl. No.: 17/604,155

(22) PCT Filed: Mar. 30, 2020

(86) PCT No.: PCT/EP2020/059010
§ 371 (c)(1),
(2) Date: Oct. 15, 2021

(87) PCT Pub. No.: WO2020/212127
PCT Pub. Date: Oct. 22, 2020

(65) Prior Publication Data
US 2022/0196307 A1 Jun. 23, 2022

(30) Foreign Application Priority Data
Apr. 17, 2019 (FR) ........................ 1904091

(51) Int. Cl.
*F25B 49/02* (2006.01)
*B60H 1/00* (2006.01)
(Continued)

(52) U.S. Cl.
CPC ......... *F25B 49/02* (2013.01); *B60H 1/00899* (2013.01); *B60H 1/2218* (2013.01);
(Continued)

(58) Field of Classification Search
CPC ... F25B 49/02; F25B 5/04; F25B 6/04; B60H 1/00899; B60H 1/2218
See application file for complete search history.

(56) References Cited

U.S. PATENT DOCUMENTS

2015/0122473 A1\* 5/2015 Nii ..................... B60H 1/00021
165/202
2016/0153697 A1 6/2016 Hamamoto et al.
(Continued)

FOREIGN PATENT DOCUMENTS

CN 104422060 A 3/2015
CN 108068577 A \* 5/2018 ......... B60H 1/00392
(Continued)

OTHER PUBLICATIONS

International Search Report and Written Opinion in corresponding International Application No. PCT/EP2020/059010, dated May 8, 2020 (10 pages).
(Continued)

*Primary Examiner* — Kun Kai Ma
(74) *Attorney, Agent, or Firm* — Osha Bergman Watanabe & Burton LLP

(57) ABSTRACT

The present invention relates to a method for controlling a thermal management device (1) of a motor vehicle comprising a refrigerant-fluid circuit comprising a compressor (3), a first heat exchanger (5), an expansion device (7) and the second heat exchanger (9), said thermal management device (1) further comprising an electric heating device (60), said control method involving, upon a starting of the thermal management device (1) from cold, the following steps: direct or indirect heating of the internal air flow (20) by the electrical heating device (60) alone until said internal air flow (200) reaches a target temperature and/or until a predetermined timer has run out, —when the internal air flow (200) has reached its target temperature and/or when
(Continued)

the timer has run out, starting the compressor (3) so that the refrigerant-fluid circuit draws heat energy from the external air flow (100) at the second heat exchanger (9) and gives up said heat energy at the first heat exchanger (5).

8 Claims, 4 Drawing Sheets

(51) Int. Cl.
  *B60H 1/22* (2006.01)
  *F25B 5/04* (2006.01)
  *F25B 6/04* (2006.01)

(52) U.S. Cl.
  CPC ............... *F25B 5/04* (2013.01); *F25B 6/04* (2013.01); *F25B 2400/01* (2013.01); *F25B 2400/0409* (2013.01); *F25B 2400/0411* (2013.01); *F25B 2600/01* (2013.01)

(56) References Cited

U.S. PATENT DOCUMENTS

2017/0369080 A1    12/2017  Mijin
2019/0111762 A1*    4/2019  Cho ................... B60H 1/2218

FOREIGN PATENT DOCUMENTS

| CN | 109693509 A | * | 4/2019 | ......... B60H 1/00021 |
| CN | 111762000 A | * | 10/2020 | ......... B60H 1/00007 |
| EP | 3031641 A1 | | 6/2016 | |
| FR | 2983285 A1 | | 5/2013 | |
| FR | 3026478 A1 | | 4/2016 | |
| JP | S56137029 A | | 10/1981 | |
| JP | 2011-257079 A | | 12/2011 | |
| JP | 2015001354 A | | 1/2015 | |

OTHER PUBLICATIONS

First Office Action in corresponding Chinese Application No. 202080017873.7, dated Jun. 13, 2022 (15 pages).

* cited by examiner

METHOD FOR CONTROLLING A THERMAL MANAGEMENT DEVICE OF A MOTOR VEHICLE

The invention relates to the field of electric and hybrid motor vehicles and more particularly to a method for managing a heating device with a heat pump for such a motor vehicle.

In the field of electric and hybrid vehicles, in which it is difficult to reconcile good battery autonomy and efficient heating of the vehicle interior, it is known practice to use a thermal management device that has a refrigerant fluid circuit inside which a refrigerant fluid circulates and that can operate in a heat pump mode. to Such a thermal management device is particularly useful upon starting, when the combustion engine of hybrid vehicles is cold or else for electric vehicles that do not have a combustion engine from which to recover heat. The refrigerant fluid circuit comprises, successively in the direction of circulation of the refrigerant fluid, a compressor, a condenser intended to heat an internal flow of air going towards the vehicle interior, an expansion device and an evaporator intended to draw off heat from the outside air.

However, these thermal management devices can take a long time to heat up and can therefore take a certain time before reaching a setpoint temperature determined by the user.

In order to reduce this time to reach the setpoint temperature, it is known practice to add an electric heating device within the thermal management device. Nevertheless, depending on the methods for controlling the thermal management device, the time to reach the setpoint temperature can still be quite long. In addition, problems of frosting at the evaporator, in particular when the outside temperature is less than or equal to 5° C., can reduce the efficiency of the thermal management device.

One of the aims of the present invention is to at least partially remedy the drawbacks of the prior art and to propose a method for controlling a thermal management device that has an improved electric heating device.

The present invention therefore relates to a method for controlling a thermal management device of a motor vehicle, said thermal management device having a refrigerant fluid circuit in which a first heat transfer fluid is intended to circulate and being configured to operate in a heat pump mode, said refrigerant fluid circuit having, in the direction of circulation of the refrigerant fluid in heat pump mode:
   a. a compressor,
   b. a first heat exchanger intended to exchange heat energy directly or indirectly with an internal air flow,
   c. an expansion device,
   d. a second heat exchanger intended to have an external air flow passing through it,
   e. said thermal management device also having an electric heating device intended to directly or indirectly heat the internal air flow,
   f. said control method involving, during a cold start of the thermal management device, the following steps:
      i. direct or indirect heating of the internal air flow only by the electric heating device until said internal air flow reaches a target temperature below a comfort temperature determined in relation to a request from a user, and/or until the expiration of a predetermined timer,
      ii. when the internal air flow has reached its target temperature and/or the timer has expired, starting up of the compressor so that the refrigerant fluid circuit draws off heat energy from the external air flow at the second heat exchanger and releases said heat energy at the first heat exchanger so that the internal air flow reaches the comfort temperature.

Thus the invention relates to a control method for a thermal management device operating as an indirect heat pump, i.e. a device in which water is preheated by an electric heater before the heat pump is triggered, this having the advantage of reducing frosting of the exterior exchanger, and reaching comfort more quickly, then of cutting off the power supply to, or turning off, the electric heater completely so as to reduce consumption.

According to one aspect of the invention, when the internal air flow has reached its comfort temperature, the electrical power sent to the electric heating device is reduced and the rotational speed of the compressor is maintained or increased so as to keep the internal air flow at its comfort temperature.

According to another aspect of the invention, the target temperature to be reached of the internal air flow is 10° C. less than the comfort temperature.

According to another aspect of the invention, the timer is between 1 and 3 minutes, preferably 2 minutes.

According to another aspect of the invention, for an outside temperature below −20° C., the electrical power sent to the electric heating device during the first step of direct or indirect heating of the internal air flow only by said electric heating device is greater than 5 kW.

According to another aspect of the invention, for an outside temperature of between −20° C. and −10° C., the electrical power sent to the electric heating device, is during the first step of direct or indirect heating of the internal air flow only by said electric heating device, is between 5 and 3 kW.

According to another aspect of the invention, for an outside temperature of between −10° C. and 0° C., the electrical power sent to the electric heating device, during the first step of direct or indirect heating of the internal air flow only by said electric heating device, is between 3 and 1 kW.

According to another aspect of the invention, for an outside temperature above 0° C., the electrical power sent to the electric heating device, during the first step of direct or indirect heating of the internal air flow only by the electric heating device, is less than 1 kW.

Further features, details and advantages of the invention will become more clearly apparent upon reading the description given below by way of indication with reference to drawings, FIG. 1 shows a schematic depiction of a thermal management device according to a first embodiment.

In the various figures, identical elements bear the same reference numbers.

The following embodiments are examples. Although the description refers to one or more embodiments, this does not necessarily mean that each reference relates to the same embodiment, or that the features apply only to a single embodiment. Individual features of different embodiments can also be combined and/or interchanged to provide other embodiments.

In the present description, certain elements or parameters can be indexed, such as, for example, first element or second element and also first parameter and second parameter or else first criterion and second criterion, etc. In this case, what is concerned is a simple indexing to differentiate and denominate elements or parameters or criteria that are similar but not identical. This indexing does not imply a priority of one element, parameter or criterion with respect to another and such denominations can easily be interchanged without departing from the scope of the present description. Neither does this indexing imply any chronological order for example in assessing any given criterion.

In the present description, "placed upstream" means that an element is placed before another with respect to the direction of circulation of a fluid. By contrast, "placed downstream" means that an element is placed after another with respect to the direction of circulation of the fluid.

Figure 1:
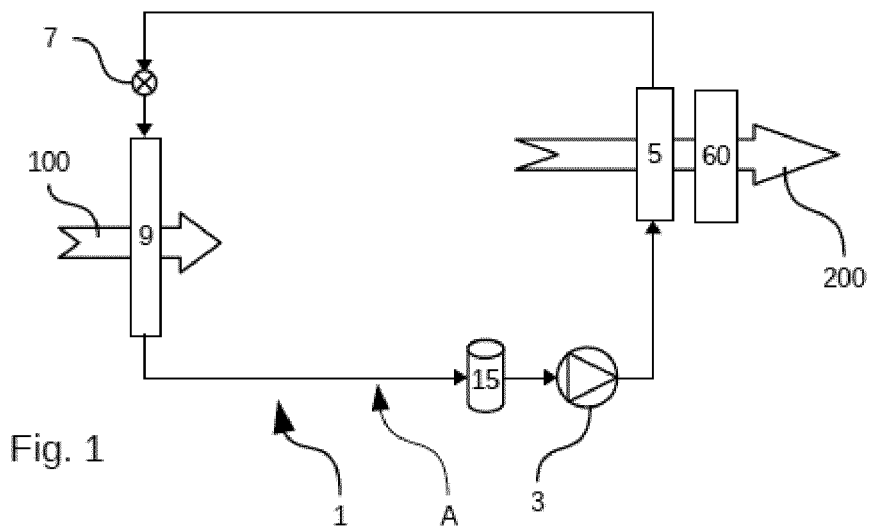

FIG. 1 shows a depiction of a thermal management device 1, in particular for an electric or hybrid vehicle. The thermal management device 1 illustrated in FIG. 1 is the simplest possible device and has the elements necessary for the operation of a heat pump. The thermal management device 1 thus comprises a refrigerant fluid circulation loop A in which a refrigerant fluid is able to circulate. This refrigerant fluid circulation loop A has, in the direction of circulation of the refrigerant fluid:
 a compressor 3,
 a first heat exchanger 5 intended to exchange heat energy directly or indirectly with an internal air flow 200,
 a first expansion device 7, and
 a second heat exchanger 9 intended to have an external air flow 100 is passing through it, An internal air flow 200 means an air flow passing in particular through a heating, ventilation and/or air conditioning device (not shown) and bound for the interior of the motor vehicle. In order to create the internal air flow 200, the heating, ventilation and/or air conditioning device can in particular have a fan (not shown). An external air flow 100 means a flow of air external to the motor vehicle, passing through the second heat exchanger 9 that is in particular disposed on the front face of the motor vehicle.

The thermal management device 1 also has an electric heating device 60 intended to directly or indirectly heat the internal air flow 200.

According to a first embodiment illustrated in FIG. 1, the first heat exchanger 5 can be a condenser intended to have an internal air flow 200 bound for the interior of the motor vehicle passing through it. For this, the first heat exchanger 5 can more particularly be disposed within the heating, ventilation and/or air conditioning device.

According to this first embodiment, the first heat exchanger 5 can thus directly exchange heat energy with an internal air flow 200. This heat energy is recovered in the external air flow 100 at the second heat exchanger 9, also called the evaporator. This first embodiment is also called a direct heat pump.

The electric heating device 60 is, for its part, disposed in the internal air flow 200, in particular in the heating, ventilation and/or air conditioning device. The electric heating device 60 can thus directly heat the internal air flow 200.

The electric heating device 60 can in particular be disposed downstream of the first heat exchanger 5 in the direction of circulation of the internal air flow 200. The electric heating device 60 can for example be a high voltage heater having one or more positive temperature coefficient thermistors (which are also known by the acronym FTC).

Figure 2:
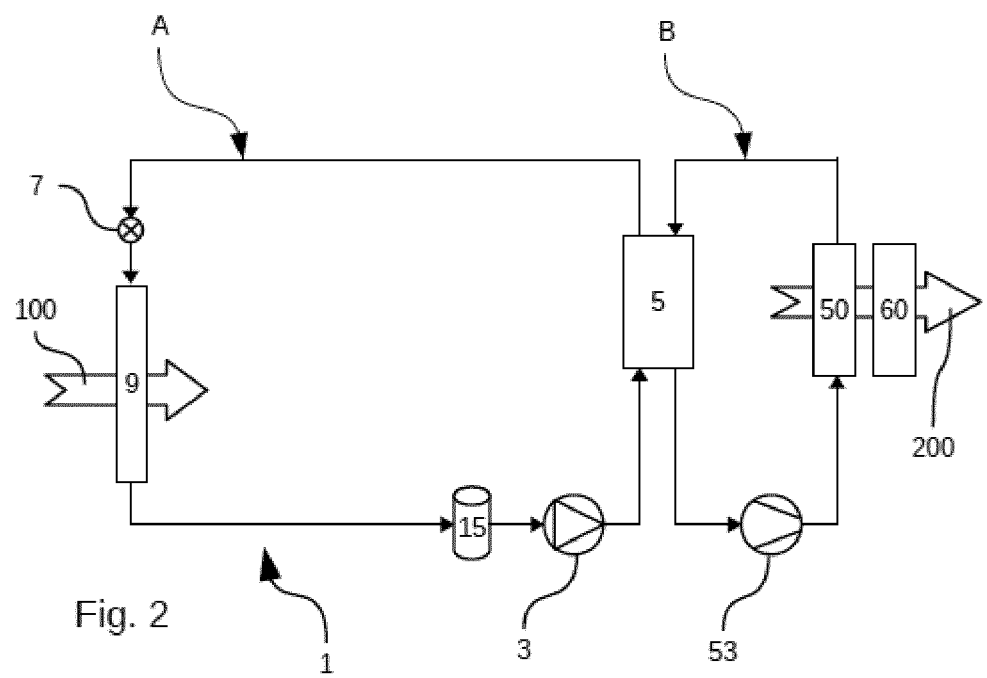
FIG. 2 shows a schematic depiction of a thermal management device according to a second embodiment.
Figure 3:
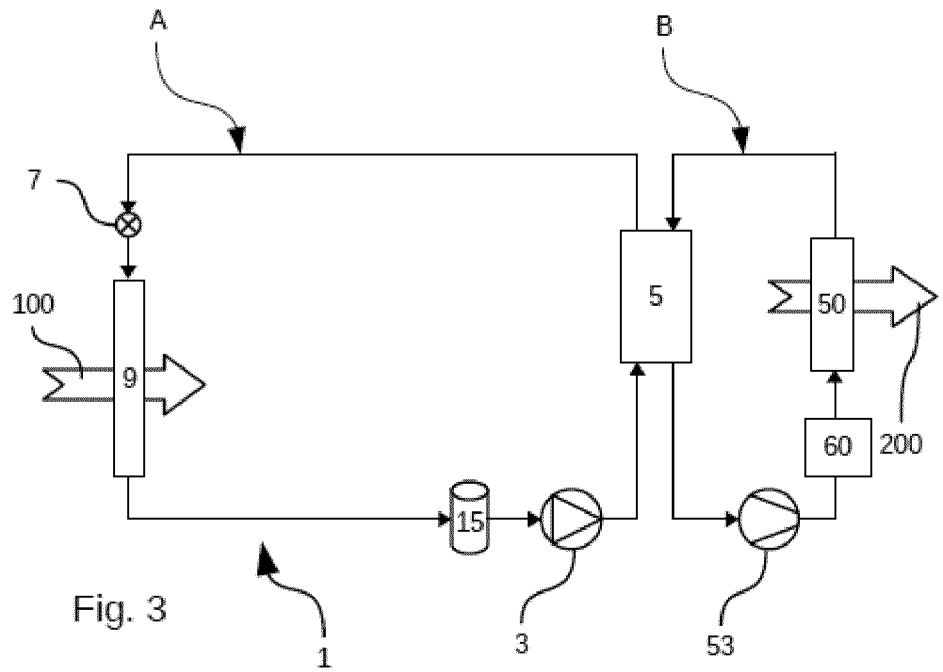
FIG. 3 shows a schematic depiction of a thermal management device according to a third embodiment.

According to a second embodiment illustrated in FIGS. 2 and 3, the first heat exchanger 5 can be a dual-fluid heat exchanger intended to have the refrigerant fluid of the refrigerant fluid circulation loop A and a heat transfer fluid of a heat transfer fluid circulation loop B jointly passing through it. This heat transfer fluid circulation loop B has in particular a pump 53 and a third heat exchanger 50 intended to be have the internal air flow 200 passing through it. For this, the third heat exchanger 50 can more particularly be disposed within a heating, ventilation and/or air conditioning device (not shown).

According to this second embodiment, the first heat exchanger 5 can thus indirectly exchange heat energy with the internal air flow 200 via the heat transfer fluid circulation loop B and its third heat exchanger 50. This heat energy is recovered in the external air flow 100 at the second heat exchanger 9, also called the evaporator. Due to the presence of this heat transfer fluid circulation loop B, this second embodiment is also called an indirect heat pump.

According to a first variant of this second embodiment, illustrated in FIG. 2, the electric heating device 60 is disposed in the internal air flow 200, in particular in the heating, ventilation and/or air conditioning device. The electric heating device 60 can thus directly heat the internal air flow 200, The electric heating device 60 can in particular be disposed downstream of the third heat exchanger 50 in the direction of circulation of the internal air flow 200.

According to a second variant of this second embodiment, illustrated in FIG. 3, the electric heating device 60 is disposed in the heat transfer fluid circulation loop B, The electric heating device 60 can thus indirectly heat the internal air flow 200 by heating the heat transfer fluid of the heat transfer fluid circulation loop B. The electric heating device 60 can in particular be disposed in the direction of circulation of the heat transfer fluid upstream of the third heat exchanger 50.

In FIGS. 1 to 3, the direction of circulation of the refrigerant fluid is illustrated by arrows.

For these first and second embodiments, the first expansion device 7 can be, for example, an expansion device of which the opening can be controlled in order to control the pressure of the refrigerant fluid at its outlet or else an orifice tube that is calibrated so as to obtain a defined pressure at its outlet.

The depictions in FIGS. 1 to 3 are merely example of architecture of a heat pump device. Other more or less complex architectures are entirely conceivable and can come within the scope of the invention.

The refrigerant fluid circulation loop A can also include a phase separation device 15, such as for example a desiccant cartridge, arranged upstream of the compressor 3, between the second heat exchanger 9 and said compressor 3.

As shown by the first and second embodiment of the thermal management device 1, the latter can be solely dedicated to operating in heat pump mode, i.e. to heating the internal air flow 200 by drawing off heat energy from the external air flow 200.

Figure 4:
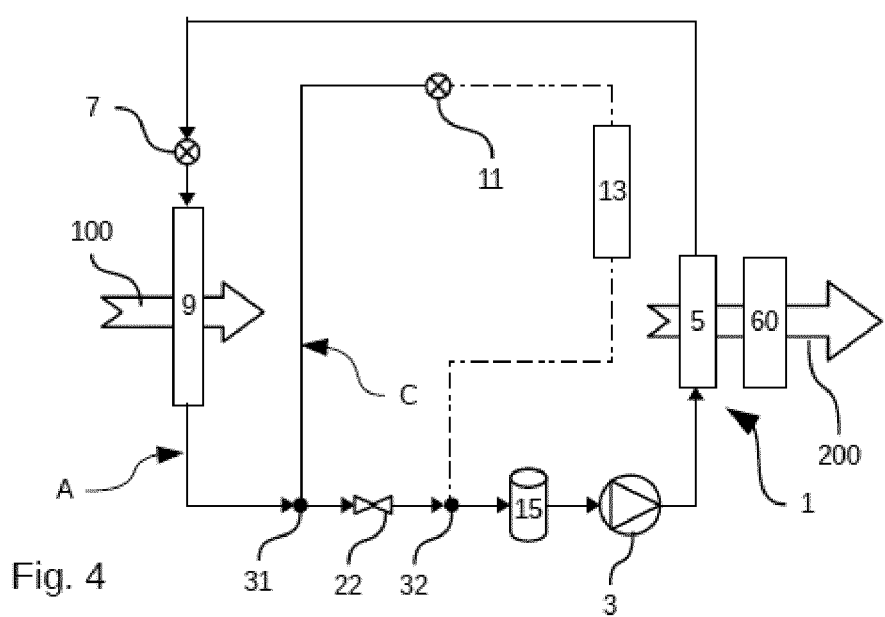
FIG. 4 shows a schematic depiction of a thermal management device according to a fourth embodiment.
Figure 5:
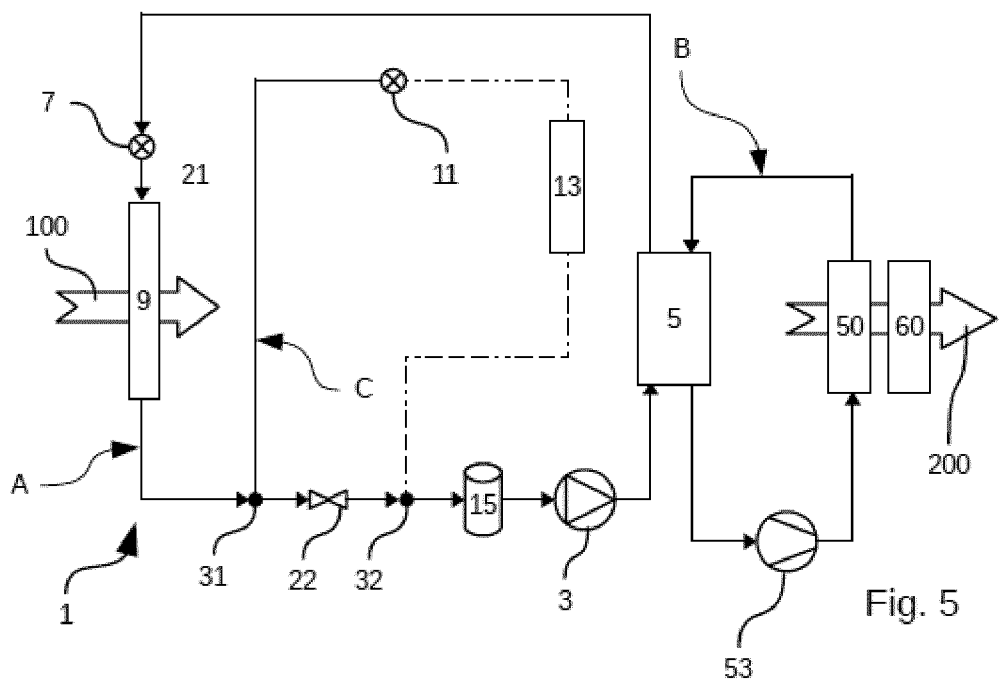
FIG. 5 shows a schematic depiction of a thermal management device according to a fifth embodiment.
Figure 6:
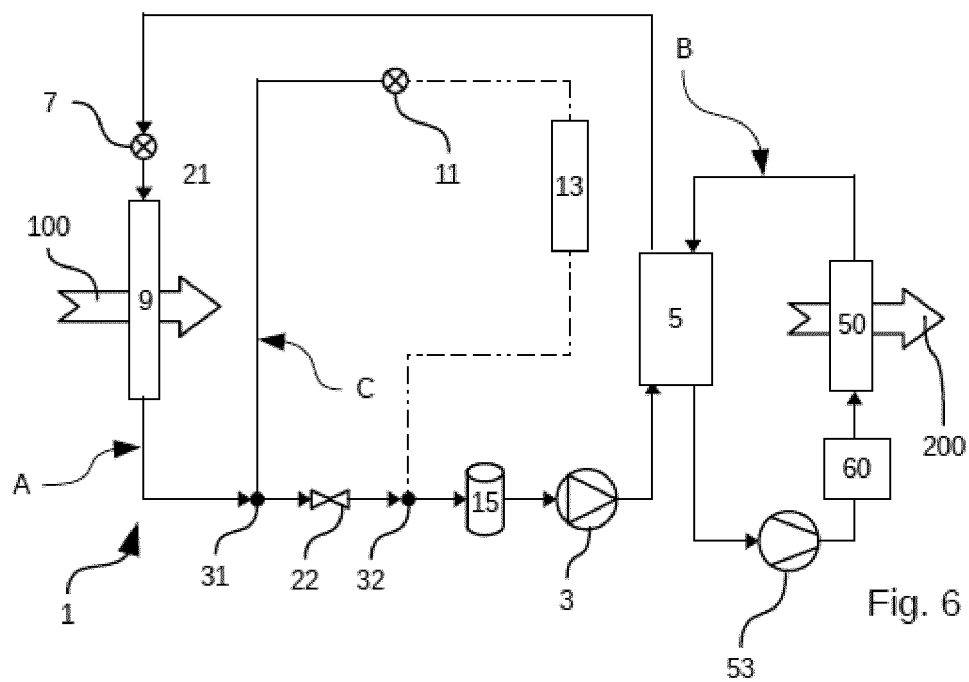
FIG. 6 shows a schematic depiction of a thermal management device according to a sixth embodiment.

However, it is also possible for the thermal management device 1 to be a reversible air conditioning device as for example illustrated in FIGS. 4 to 6. In this scenario, the thermal management device 1 is configured to operate in various modes such as for example:

a cooling mode in which the thermal management device 1 cools the internal air flow 200 and releases heat energy into the external air flow 100, a heat pump mode in which the thermal management device 1 heats the internal air flow 200 by drawing off heat energy from the external air flow 100, a dehumidifying mode in which the thermal management device 1 firstly cools the internal air flow 200 and then, secondly, heats it.

The depictions in FIGS. 4 to 6 are merely examples of architecture of a reversible air conditioning device. Other more or less complex architectures are entirely conceivable and can come within the scope of the invention.

Like the embodiments in FIGS. 1 to 3, the thermal management device 1 still has a refrigerant fluid circulation loop A having a compressor 3, a first heat exchanger 5, a first expansion device 7 and a second heat exchanger 9.

FIG. 4 shows a case similar to FIG. 1, in which the first heat exchanger 5 and the electric heating device 60 can directly exchange heat energy with the internal air flow 200.

FIG. 5 shows a case similar to FIG. 2, in which the first heat exchanger 5 can indirectly exchange with the internal air flow 200 via the heat transfer fluid circulation loop B and the third heat exchanger 50. The electric heating device 60 is can, for its part, directly exchange heat energy with the internal air flow 200.

FIG. 6 shows a case similar to FIG. 3, in which the first heat exchanger 5 can indirectly exchange with the internal air flow 200 via the heat transfer fluid circulation loop B and the third heat exchanger 50. The electric heating device 60 can, for its part, indirectly exchange heat energy with the internal air flow 200 by heating the heat transfer fluid of the heat transfer fluid circulation loop B.

Still as illustrated in FIGS. 4 to 6, the thermal management device 1 also has a bypass line C connecting a first junction point 31 to a second junction point 32. The first junction point 31 is disposed downstream of the second heat exchanger 9, between said second heat exchanger 9 and the compressor 3. The second junction point 32 is, for its part, disposed downstream of the first junction point 31, between said first junction point 31 and the compressor 3.

The bypass line C has a second expansion device 11 disposed upstream of a fourth heat exchanger 13. This fourth heat exchanger 13, also called the internal evaporator, is in particular intended to have the internal air flow 200 passing through it. The fourth heat exchanger 13 can more particularly be disposed within the heating, ventilation and/or air conditioning device (not shown), in particular upstream of the first heat exchanger 5 or of the third heat exchanger 50 in the direction of circulation of the internal air flow 200.

In order to allow or prevent the refrigerant fluid passing into the bypass line, a shut-off valve 22 can be disposed between the first 31 and the second junction point 32. The second expansion device 11 can, for its part, include a shut-off function, i.e. it is able to block the flow of refrigerant fluid into the bypass line C when it is completely closed.

This bypass line C is used in air conditioning mode or in dehumidifying mode in order to cool the internal air flow 200 via the fourth heat exchanger 13.

In FIGS. 4 to 6, only the mode of operation in heat pump mode is shown. The direction of circulation of the refrigerant fluid is represented by arrows. The shut-off valve 22 is thus open and the second expansion device 11 is closed such that the refrigerant fluid does not circulate in the fourth heat exchanger 13.

The present invention relates to a method for controlling a thermal is management device 1 as described above during a cold start. This management method is more particularly implemented by an electronic control unit on board the motor vehicle.

The control method thus involves, during a cold start of the thermal management device 1, the following steps:

direct or indirect heating of the internal air flow 200 only by the electric heating device 60 until said internal air flow 200 reaches a target temperature below a comfort temperature determined in relation to a request from a user, and/or until the expiration of a predetermined timer, when the internal air flow 200 has reached its target temperature and/or the timer has expired, starting up of the compressor 3 so that the refrigerant fluid circuit draws off heat energy from the external air flow 100 at the second heat exchanger 9 and releases said heat energy at the first heat exchanger 5 so that the internal air flow 200 reaches the temperature necessary for ensuring a level of comfort.

The comfort temperature corresponds to the temperature of the internal air flow 200 that has been determined in order to heat the interior of the motor vehicle and in order to reach the temperature desired and programmed by the user.

The target temperature to be reached by the internal air flow 200 can in particular be a temperature that is 0° C. to 30° C. lower, preferentially 5° C. to 15° C. lower, than the setpoint temperature sent by the comfort controller.

The comfort temperature corresponds to the temperature of the internal air flow 200 that has been determined in order to heat the interior of the motor vehicle and in order to reach the temperature desired and programmed by the user.

The target temperature to be reached of the internal air flow 200 can in particular be a temperature that is 10° C. to 30° C. lower than the comfort temperature. The choice of this temperature depends simultaneously on the outside temperature, on the level of the air flow and on the embodiment of the heating, in particular direct or indirect electric heating. For example, the target temperature can be between 35° C. and 50° C., preferably between 40° C. and 45° C.

For example, the target temperature can be between 10 and 70° C., preferably between 35 and 50° C.

The timer can, for its part, be between 1 and 3 minutes, preferably 2 minutes.

Depending on the outside temperature, the electrical power sent to the electric heating device 60 during the first step of direct or indirect heating of the internal air flow 200 only by said electric heating device 60 can vary. Indeed, the lower the outside temperature, the more it is necessary to send a significant amount of electrical power so as to quickly heat the internal air flow 200.

Thus, for an outside temperature below −20° C., the electrical power sent to the electric heating device 60 can be greater than 5 kW.

For an outside temperature of between −20° C. and −10° C., the electrical power sent to the electric heating device 60 can be between 5 and 3 kW.

For an outside temperature of between −10° C. and 0° C., the electrical power sent to the electric heating device 60 can be between 3 and 1 kW.

Finally, for an outside temperature above 0° C., the electrical power sent to the electric heating device 60 can be less than 1 kW.

This variation in the electrical power sent to the electric heating device 60 makes it possible to adapt the electrical consumption to the requirements, limiting the consumption as the outside temperature becomes closer to 0° C. This thus makes it possible to save electrical energy and therefore improve the battery autonomy, in particular for an electric or hybrid vehicle.

The method for controlling the thermal management device 1 can also involve an additional step in which, when the internal air flow 200 has reached its comfort temperature, the electrical power sent to the electric heating device 60 is reduced and the rotational speed of the compressor 3 is maintained or increased so as to keep the internal air flow 200 at its comfort temperature.

This third step makes it possible to use less electrical energy at the electric heating device and to use the refrigerant fluid circuit A, which consumes less energy.

Figure 7:
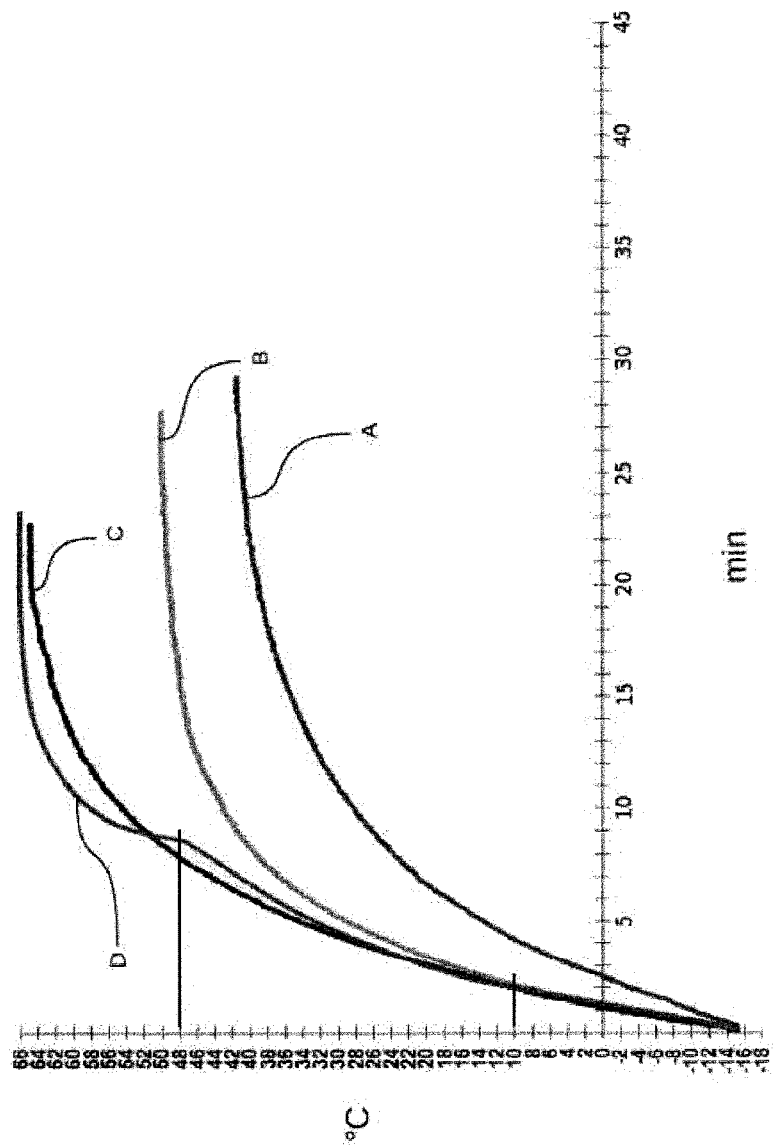
FIG. 7 shows a diagram of the change in the temperature of an internal air flow as a function of time according to various methods for controlling a thermal management device.

FIG. 7 shows a diagram of the change in the temperature in ° C. of the internal air flow 200 as a function of the time in minutes according to various methods for controlling the thermal management device 1. The outside air temperature is −18° C. in this case. The thermal management device 1 used in the example in this FIG. 7 is an indirect heat pump that has an electric heating device 60 heating the heat transfer fluid as described in the second variant of the second embodiment (see FIGS. 3 and 6).

In this diagram in FIG. 7, curve A shows the change in the temperature of the internal air flow 200 for a method in which only the heat pump is used without the electric heating device 60 being used. Thus, only the compressor 3 and the pump 53 are in operation. This curve A has a logarithmic profile with a plateau at a temperature of the internal air flow 200 of about 42° C.

Curve B shows the change in the temperature of the internal air flow 200 for a method in which only the electric heating device 60 is used, at a power of 4 kW. Thus, only the electric heating device 60 and the pump 53 are in operation. This curve B also has a logarithmic profile with a faster temperature increase than for curve A, illustrated by a steeper slope, and with a plateau at a temperature of the internal aft flow 200 of about 50° C., above the plateau of curve A.

Curve C shows, for its part, the change in the temperature of the internal air flow 200 for a method according to the invention in which firstly only the electric heating device 60 is used, at a power of 4 kW for a duration of 2 minutes. During these 2 minutes, the slope of curve C showing the speed of the temperature increase is identical to that of curve B. Secondly, at the end of these 2 minutes, the heat pump is started up by starting the compressor 3. Curve C then shows an even steeper slope than that of curve B, indicating a faster rise in temperature before reaching a plateau at a temperature of about 65° C., well above that of curves A and B.

Curve D also shows the change in the temperature of the internal air flow 200 for a method according to the invention in which, firstly, only the electric heating device 60 is used, at a power of 5 kW, until a target internal air flow temperature of 48° C. is reached, During the first 2 minutes the slope of curve D showing the speed of the temperature increase is identical to that of curves B and C. Up to 4 minutes, the slope of curve D remains identical to that of curve C. The slope of curve D is then less than that of curve C while remaining greater than that of curve B, until the internal air flow 200 reaches a temperature of 48° C. Secondly, when the internal air flow 200 is at 48° C., the heat pump is started up by starting the compressor 3. Curve D then shows an even steeper slope than that of curve C, indicating a faster rise in temperature before reaching a plateau at a temperature of about 66° C., well above that of curves A and B. Curve D reaches its plateau before curve C, indicating faster heating.

Thus, it can be clearly seen that the management method according to the invention allows a faster rise in temperature while at the same time having a high coefficient of performance upon a cold start. This results in better comfort for the one or more users within the vehicle interior.

The invention claimed is:

1. A method for controlling a thermal management device of a motor vehicle, said thermal management device having a refrigerant fluid circuit in which a first heat transfer fluid is configured to circulate and being configured to operate in a heat pump mode, said refrigerant fluid circuit having, in the direction of circulation of the refrigerant fluid in heat pump mode:
   a compressor, a first heat exchanger configured to exchange heat energy directly or indirectly with an internal air flow, an expansion device, a second heat exchanger configured to have an external air flow pass through, and
   an electric heating device configured to directly or indirectly heat the internal air flow,
   said control method involving, during a cold start of the thermal management device:
   direct or indirect heating of the internal air flow only by the electric heating device until said internal air flow reaches a target temperature below a comfort temperature determined in relation to a request from a user, and/or until the expiration of a predetermined timer; and
   in response to the internal air flow reaching the target temperature and/or the time expiring, starting up the compressor so that the refrigerant fluid circuit draws off heat energy from the external air flow at the second heat exchanger and releases said heat energy at the first heat exchanger so that the internal air flow reaches the comfort temperature.

2. The method for controlling the thermal management device as claimed in claim 1, wherein in response to the internal air flow reaching the comfort temperature, the electrical power sent to the electric heating device is reduced and the rotational speed of the compressor is maintained or increased so as to keep the internal air flow at the comfort temperature.

3. The method for controlling the thermal management device as claimed in claim 1, wherein the target temperature to be reached of the internal air flow is 10° C. to 30° C. less than the comfort temperature.

4. The method for controlling the thermal management device as claimed in claim 1, wherein the timer is between 1 and 3 minutes.

5. The method for controlling the thermal management device as claimed in claim 1, wherein, for an outside temperature below −20° C., the electrical power sent to the electric heating device during the first step of direct or indirect heating of the internal air flow only by said electric heating device is greater than 5 kW.

6. The method for controlling the thermal management device as claimed in claim 1, wherein, for an outside temperature of between −20° C. and −10° C., the electrical power sent to the electric heating device, during the first step of direct or indirect heating of the internal air flow only by said electric heating device, is between 5 and 3 kW.

7. The method for controlling the thermal management device as claimed in claim 1, wherein, for an outside temperature of between −10° C. and 0° C., the electrical power sent to the electric heating device, during the first step of direct or indirect heating of the internal air flow only by said electric heating device, is between 3 and 1 kW.

8. The method for controlling the thermal management device as claimed in claim 1, wherein, for an outside temperature above 0° C., the electrical power sent to the electric heating device, during the first step of direct or indirect heating of the internal air flow only by the electric heating device, is less than 1 kW.

\* \* \* \* \*